US012750650B2

(12) United States Patent
Faltaous et al.

(10) Patent No.: US 12,750,650 B2
(45) Date of Patent: Sep. 29, 2026

(54) LOCATION TRACKING AND DISTRESS NOTIFICATIONS USING WIRELESS NETWORK

(71) Applicant: T-MOBILE INNOVATIONS LLC, Overland Park, KS (US)

(72) Inventors: Maikel E. Faltaous, Renton, WA (US); Kristopher Michael McNeil, Sammamish, WA (US); Kevin Lorne Engelbert, Mukilteo, WA (US); Barry Robert Butterklee, Sammamish, WA (US)

(73) Assignee: T-Mobile Innovations LLC, Overland Park, KS (US)

( * ) Notice: Subject to any disclaimer, the term of this patent is extended or adjusted under 35 U.S.C. 154(b) by 324 days.

(21) Appl. No.: 18/393,983

(22) Filed: Dec. 22, 2023

(65) Prior Publication Data

US 2025/0211959 A1 Jun. 26, 2025

(51) Int. Cl.

*H04W 4/90* (2018.01)
*H04W 4/02* (2018.01)
*H04W 4/029* (2018.01)

(52) U.S. Cl.

CPC ............. *H04W 4/90* (2018.02); *H04W 4/029* (2018.02)

(58) Field of Classification Search

CPC ......... H04W 4/90; H04W 4/80; H04W 4/029; H04W 8/16; H04W 52/0261; H04W 52/0277; H04W 4/02

See application file for complete search history.

(56) References Cited

U.S. PATENT DOCUMENTS

| | | | | |
|---|---|---|---|---|
| 2009/0276700 A1* | 11/2009 | Anderson | H04W 4/029 | 715/700 |
| 2015/0044983 A1 | 2/2015 | Nasir et al. | | |
| 2015/0140924 A1* | 5/2015 | Marathe | H04W 4/90 | 455/3.01 |
| 2017/0124788 A1* | 5/2017 | Nishida | G07C 5/0866 | |
| 2019/0082315 A1* | 3/2019 | Cavendish | H04W 52/0261 | |
| 2019/0327597 A1 | 10/2019 | Katz et al. | | |
| 2020/0404745 A1 | 12/2020 | Costa | | |

(Continued)

OTHER PUBLICATIONS

International Search Report and Written Opinion received for PCT Patent Application No. PCT/US2024/060918, mailed on Feb. 28, 2025, 29 pages.

*Primary Examiner* — Khawar Iqbal

(74) *Attorney, Agent, or Firm* — Shook, Hardy & Bacon L.L.P.

(57) ABSTRACT

Aspects herein capture methods, media, devices, and systems for communicating distress notifications over wireless networks. A tracking device can generate a distress notification that encodes a current location and sensor data over a wireless network, such as a satellite network, for routing to a cloud-based platform that may initiate further actions responsive to the distress notification. The tracking device can intelligently determine a quantity, a periodicity, and/or sensor data to include within various distress notification(s) based on the type of wireless network that is in-range, the power to be used by the tracking device when communicating distress notification(s) over that type of wireless network, the amount of power available and/or remaining in an integrated and/or accessory power supply of the tracking device, or any combination thereof.

20 Claims, 3 Drawing Sheets

(56) References Cited

U.S. PATENT DOCUMENTS

| | | | | |
|---|---|---|---|---|
| 2021/0092796 | A1* | 3/2021 | Kumar | H04W 76/50 |
| 2022/0263590 | A1* | 8/2022 | Koo | H04B 17/309 |
| 2022/0303723 | A1* | 9/2022 | Khalid | H04W 48/16 |
| 2022/0322055 | A1* | 10/2022 | Zorgui | G01S 5/0244 |
| 2023/0081032 | A1* | 3/2023 | Ardaud | H04M 1/72454 455/404.1 |
| 2024/0406770 | A1* | 12/2024 | Gajula | H04L 65/1045 |
| 2024/0406915 | A1* | 12/2024 | Teyeb | H04L 5/0051 |
| 2025/0315777 | A1* | 10/2025 | Skaaksrud | G06Q 10/0833 |

* cited by examiner

LOCATION TRACKING AND DISTRESS NOTIFICATIONS USING WIRELESS NETWORK

TECHNICAL BACKGROUND

The present disclosure generally relates to a location tracking.

SUMMARY

A high-level overview of various aspects of the invention are provided here to offer an overview of the disclosure and to introduce a selection of concepts that are further described below in the detailed description section. This summary is not intended to identify key features or essential features of the claimed subject matter, nor is it intended to be used as an aid in isolation to determine the scope of the claimed subject matter.

In one aspect, a computerized method is provided. In accordance with the method, a wireless network that is available to a tracking device and a wireless network type of that wireless network are identified, based on and/or in response to an indication to initiate a distress notification. The current level of a power supply of the tracking device is determined. Based on the wireless network type and the current level of the power supply, a current location and sensor data are captured. Then, a distress notification that comprises the current location and/or the sensor data is generated and communicated from the tracking device over the wireless network that is available.

In another aspect, one or more non-transitory computer-readable media storing instructions are provided that, when executed via one or more processors, perform a computerized method. In accordance with the media, a wireless network that is available to a tracking device and a wireless network type of that wireless network are identified, based on and/or in response to an indication to initiate a distress notification. The current level of a power supply of the tracking device is determined. Based on the wireless network type and the current level of the power supply, a current location and sensor data are captured. Then, a distress notification that comprises the current location and the sensor data is generated and communicated from the tracking device over the wireless network that is available.

In yet another aspect, a system is provided. The system comprises a tracking device having a memory, a sensor, a global positioning system, an antenna, a power supply, and a processor. The processor is configured to, based on an indication to initiate a distress notification, identify a wireless network that is available to the tracking device and a wireless network type of that wireless network. The processor is configured to determine a current level of the power supply of the tracking device. The processor is configured to, based on the wireless network type and the current level of the power supply, capture a current location and sensor data for the distress signal to be generated. The processor is configured to generate and communicate, from the tracking device over the wireless network that is available, the distress notification that comprises the current location and the sensor data.

BRIEF DESCRIPTION OF THE DRAWINGS

Aspects are described in detail below with reference to the attached drawings figures, wherein.

DETAILED DESCRIPTION

Figure 1:
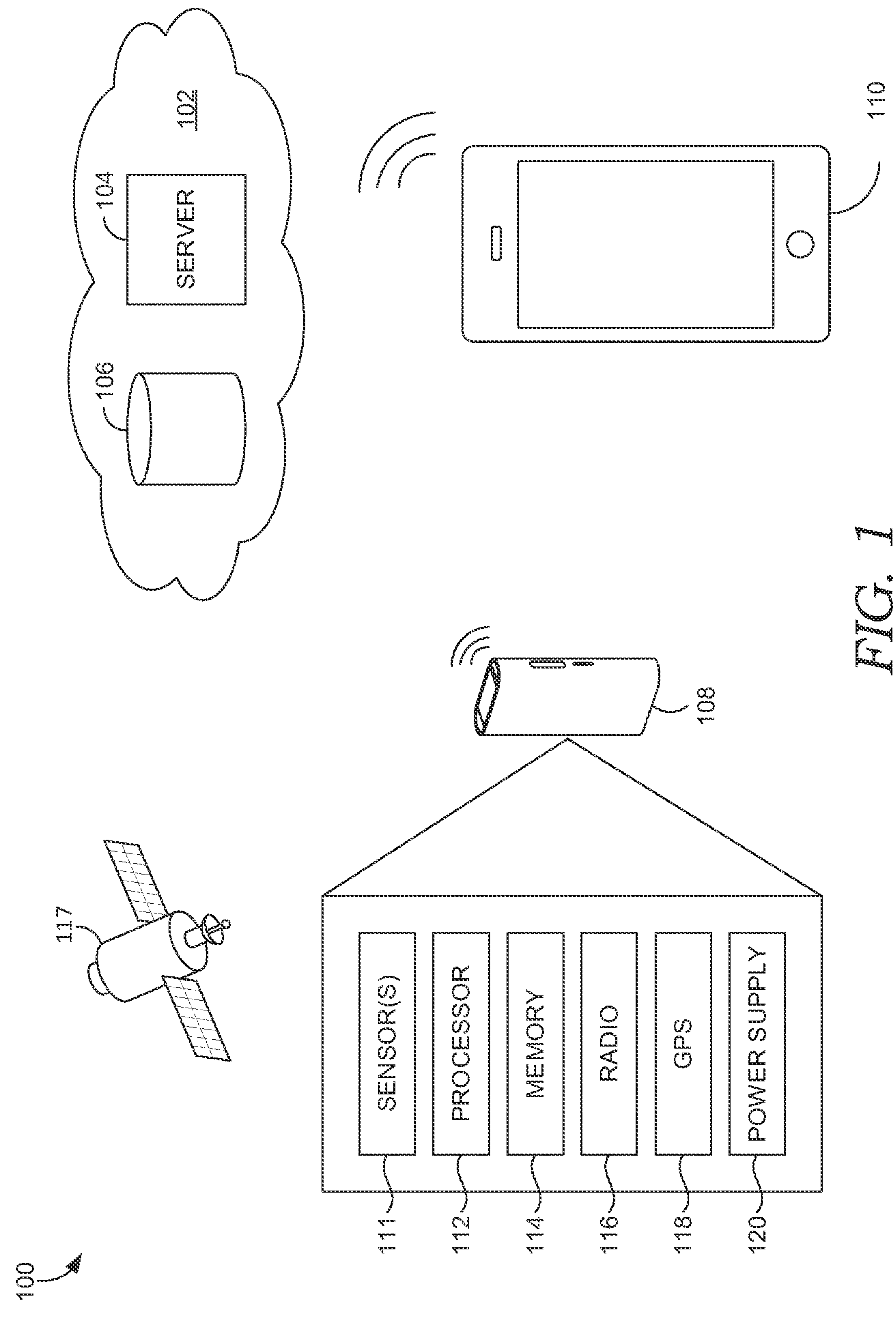
FIG. 1 depicts an example of a system environment in accordance with aspects.

The subject matter of the present invention is being described with specificity herein to meet statutory requirements. However, the description itself is not intended to limit the scope of this patent. Rather, the inventors have contemplated that the claimed subject matter might also be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described. As such, although the terms "step" and/or "block" may be used herein to connote different elements of systems and/or methods, the terms should not be interpreted as implying any particular order and/or dependencies among or between various components and/or steps herein disclosed unless and except when the order of individual steps is explicitly described. The present disclosure will now be described more fully herein with reference to the accompanying drawings, which may not be drawn to scale and which are not to be construed as limiting. Indeed, the present invention can be embodied in many different forms and should not be construed as limited to the aspects set forth herein.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the present invention. The following is a list of these acronyms:

| | |
|---|---|
| 3G | Third-Generation Wireless Access Technology |
| 4G | Fourth-Generation Wireless Access Technology |
| 5G/5G NR | Fifth-Generation Wireless Access Technology/ New Radio |
| 5GC | Fifth-Generation Wireless Access Technology Core Network |
| AAU | Active Antenna Unit |
| BRS | Broadband Radio Service |
| CD-ROM | Compact Disk Read Only Memory |
| CDMA | Code Division Multiple Access |
| CU | Central Unit |
| DU | Distribution Unit |
| EIRP | Equivalent Isotropically Radiated Power |
| eNodeB | Evolved Node B |
| EVDO | Evolution-Data Optimized |
| GIS | Geographic/Geographical/Geospatial Information System |
| gNodeB/gNB | Next Generation Node B |
| gNB CU | Next Generation Node B Central Unit |
| gNB DU | Next Generation Node B Distribution Unit |
| GPRS | General Packet Radio Service |
| GSM | Global System for Mobile Communication |
| iDEN | Integrated Digital Enhanced Network |
| DVD | Digital Versatile Disc |
| EEPROM | Electrically Erasable Programmable Read-Only Memory |
| FD-MIMO | Full Dimension Multiple-Input Multiple-Output |
| IOT | Internet of Things |

-continued

| | |
|---|---|
| IIOT | Industry Internet of Things |
| LED | Light Emitting Diode |
| LTE | Long Term Evolution |
| MEC | Mobile Far Edge Computer |
| MD | Mobile Device |
| MIMO | Multiple-Input Multiple-Output |
| mMIMO | Massive Multiple-Input Multiple-Output |
| MMU | Massive Multiple-Input Multiple-Output Unit |
| mmWave | Millimeter Wave |
| NEXRAD | Next-Generation Radar |
| NR | New Radio |
| OOBE | Out-of-Band-Emission |
| OTN | Optical Transport Network |
| PC | Personal Computer |
| PCS | Personal Communications Service |
| PDA | Personal Digital Assistant |
| PLMN | Public Land Mobile Network |
| PRB | Physical Resource Block |
| vPRB | Virtualized Physical Resource Block |
| RAN | Radio Access Network |
| RAM | Random Access Memory |
| RET | Remote Electrical Tilt |
| RF | Radio-Frequency |
| RFI | Radio-Frequency Interference |
| RIC | Radio Intelligent Controller |
| RLF | Radio Link Failure |
| R/N | Relay Node |
| RNR | Reverse Noise Rise |
| ROM | Read-Only Memory |
| RRU | Remote Radio Unit |
| RSRP | Reference Signal Receive Power |
| RSRQ | Reference Signal Receive Quality |
| RSSI | Received Signal Strength Indicator |
| RU | Radio Unit |
| SINR | Signal-to-Interference-&-Noise Ratio |
| SNR | Signal-to-Noise Ratio |
| SON | Self-Organizing Networks |
| TDMA | Time Division Multiple Access |
| TXRU | Transceiver (or Transceiver Unit) |
| UE | User Equipment |
| UMTS | Universal Mobile Telecommunications System |
| UTRAN | UMTS Radio Access Network |
| E-UTRAN | Evolved Universal Mobile Telecommunications System |
| WCD | Wireless Communication Device (interchangeable with UE) |
| WLAN | Wireless Local Area Network |
| XR | Extended Reality |

Further, various technical terms are used throughout this description. An illustrative resource that fleshes out various aspects of these terms can be found in Newton's Telecom Dictionary, 25th Edition (2009).

Aspects herein may be embodied as, among other things: a method, system, or set of instructions embodied on one or more computer-readable media. Aspects may take the form of a hardware aspect or an aspect combining software and hardware. Some aspects may take the form of a computer program product that includes computer-useable or computer-executable instructions embodied on one or more computer-readable media.

Definitions

"Computer-readable media" can be any available media and may include volatile and non-volatile media, as well as removable and non-removable media. By way of example, and not limitation, computer-readable media may include computer storage media and communication media. Computer-readable media may include both volatile and non-volatile media, removable and non-removable media, and may include media readable by a database, a switch, and various other network devices. Computer-readable media includes media implemented in any way for storing information. Examples of stored information include computer-useable instructions, data structures, program modules, and other data representations.

"Computer storage media" may include, without limitation, volatile and non-volatile media, as well as removable and non-removable media, implemented in any method or technology for the storage of information, such as computer-readable instructions, data structures, program modules, or other data. In this regard, computer storage media may include, but is not limited to, RAM, ROM, Electrically Erasable Programmable Read-Only Memory (EEPROM), flash memory or other memory technology, CD-ROM, DVD, holographic media, other optical disk storage, magnetic cassettes, magnetic tape, magnetic disk storage or other magnetic storage device, or any other medium that can be used to store the desired information and which may be accessed by the computing device 300 shown in FIG. 3. These technologies can store data momentarily, temporarily, or permanently.

"Communication media" may include, without limitation, computer-readable instructions, data structures, program modules, or other data in a modulated data signal, such as a carrier wave or other transport mechanism, and may include any information delivery media. As used herein, the term "modulated data signal" refers to a signal that has one or more of its attributes set or changed in such a manner so as to encode information in the signal. By way of example, and not limitation, communication media includes wired media such as a wired network or direct-wired connection and wireless media such as acoustic, radio frequency (RF), infrared, and other wireless media. Combinations of any of the above may also be included within the scope of computer-readable media.

"Aerospace" is used herein to refer generally to the Earth's atmosphere and the outer space within the proximate vicinity of the Earth's atmosphere. In the context of an access point, the term "aerospace" is used to refer to a physical location of such an access point or satellite that is located within and/or orbiting within the Earth's atmosphere (e.g., in the thermosphere or exosphere) and/or the outer space within the proximate vicinity of the Earth's atmosphere, such that said physical location is not at or upon the Earth's surface.

"Network" refers to a network comprised of wireless and wired components that provide wireless communications service coverage, for example, to one or more user devices. For example, the network may include one or more, or a plurality of, wireless networks, hardwired networks, telecommunications networks, peer-to-peer networks, distributed networks, and/or any combination thereof. The network may comprise one or more access points, one or more cell sites (i.e., managed by an access point), one or more structures such as cell towers (i.e., having an antenna) associated with each access point and/or cell site, a gateway, a backhaul data center, a server that connects two or more access points, a database, a power supply, sensors, and other components not discussed herein, in various aspects. Examples of a network include a telecommunications network (e.g., 3G, 4G, 5G, CDMA, CDMA 1×A, GPRS, EVDO, TDMA, GSM, LTE, and/or LTE Advanced) and/or a satellite network (e.g., Low Earth Orbit [LEO], Medium Earth Orbit [MEO], or geostationary). Additional examples of a network include a wide area network (WAN), a local area network (LAN), a metropolitan area network (MAN), a wide area local network (WLAN), a personal area network (PAN), a campus-wide network (CAN), a storage area network (SAN), a virtual private network (VPN), an enterprise private network (EPN), a home area network (HAN), a Wi-Fi network, a Worldwide Interoperability for Microwave Access (WiMAX) network, and/or an ad hoc (mesh) network. The network may include or may communicate with a physical location component for determining a geographic location of an item, package, parcel, personnel, vehicle, end-point location, etc., by leveraging, for example, a Global Positioning System (GPS), Global'naya Navigatsionnaya Sputnikovaya Sistema (GLONASS), BeiDou Navigation Satellite System (BDS), Global Navigation Satellite System (GNSS or "Galileo"), an indoor position system (IPS), or other positioning systems that leverage non-GPS signals or networks (e.g., signals of opportunity [SOP]).

"Access point" and "base station" are used interchangeably herein to reference hardware, software, devices, or other components for a communications device or structure having an antenna, an antenna array, a radio, a transceiver, and/or a controller. An access point can be deployed terrestrially at or near the Earth's surface, or within the atmosphere, for example, to orbit the Earth. For example, an "aerospace access point" may be a satellite deployed to orbit the Earth within or above the atmosphere (e.g., in the thermosphere or exosphere), whereas a "terrestrial access point" may be a fixed or semi-fixed base station located on the Earth's surface or upon any structure located on the surface. As discussed herein, an access point is a device comprised of hardware and complex software that is deployed in a network so that the access point can control and facilitate, via one or more antennas or antenna arrays, the broadcast, transmission, synchronization, and receipt of wireless signals in order to communicate with, verify, authenticate, and provide wireless communications service coverage to one or more user devices that request to join and/or are connected to the network. Generally, an access point can communicate directly with one or more user devices according to one or more access technologies (e.g., 3G, 4G, LTE, 5G, and mMIMO). An example of an aerospace access point includes a satellite. Examples of a terrestrial access point include a base station, an eNodeB, a gNodeB, a macrocell, a small cell, a microcell, a femtocell, a picocell, and/or a computing device capable of acting as a wireless "hotspot" that enables connectivity to the network. Accordingly, the scale and coverage area of various types of access points are not limited to the examples discussed. Access points may work alone or in concert with one another, locally or remotely.

"Cell site" is generally used herein to refer to a defined wireless communications coverage area (i.e., a geographic area) serviced by an access point or a plurality of neighboring access points working together to provide a single coverage area. Also, it will be understood that one access point may control one cell site/coverage area, or, alternatively, one access point may control multiple cell sites/coverage areas.

"User equipment" (UE), "user device," "mobile device," and "wireless communication device" are used interchangeably to refer to a device having hardware and software that is employed by a user in order to send and/or receive electronic signals/communication over one or more networks, whether terrestrial or aerospace. User devices generally include one or more antennas coupled to a radio for exchanging (e.g., transmitting and receiving) transmissions with an in-range base station that also has an antenna or antenna array. In aspects, user devices may constitute any variety of devices, such as a personal computer, a laptop computer, a tablet, a netbook, a mobile phone, a smartphone, a personal digital assistant, a wearable device, a fitness tracker, or any other device capable of communicating using one or more resources of the network. User devices may include components such as software and hardware, a processor, a memory, a display component, a power supply or power source, a speaker, a touch-input component, a keyboard, and the like. In various examples or scenarios that may be discussed herein, user devices may be capable of using 5G technologies with or without backward compatibility to prior access technologies, although the term is not limited so as to exclude legacy devices that are unable to utilize 5G technologies, for example.

The terms "radio," "controller," "antenna," and "antenna array" are used interchangeably herein to refer to one or more software and hardware components that facilitate sending and receiving wireless radio frequency signals, for example, based on instructions from a base station. A radio may be used to initiate and generate information that is then sent out through the antenna array, for example, where the radio and antenna array may be connected by one or more physical paths. Generally, an antenna array comprises a plurality of individual antenna elements. The antennas discussed herein may be dipole antennas having a length, for example, of ¼, ½, 1, or 1½ wavelengths. The antennas may be monopole, loop, parabolic, traveling-wave, aperture, Yagi-Uda, conical spiral, helical, conical, radomes, horn, and/or apertures, or any combination thereof. The antennas may be capable of sending and receiving transmission via FD-MIMO, Massive MIMO, 3G, 4G, 5G, and/or 802.11 protocols and techniques.

Additionally, it will be understood that sequential or relative terms such as "first," "second," and "third" are used herein for the purposes of clarity in distinguishing between elements or features, but the terms are not used herein to import, imply, or otherwise limit the relevance, importance, quantity, technological functions, physical or temporal sequence, physical or temporal order, and/or operations of any element or feature unless specifically and explicitly stated as such.

Overview

As discussed hereinafter, aspects involve a tracking device that can leverage wireless networks, including satellite networks, to communicate distress notifications with location information and/or sensor-captured data. For example, a tracking device can generate and communicate a distress notification using an available network that is in-range, whether Wi-Fi, telecommunications, and/or satellite based, to provide a current location of the tracking device indirectly to another device and/or user. The tracking device may capture sensor data of its environment, which can be included with or integrated into the distress notification. The quantity, frequency, type of distress notification, and type of wireless network used may be considered and intelligently selected by the tracking device to optimize communication of the distress notification.

For example, the tracking device may consider available power sources (e.g., an integrated battery and/or accessory power source), the power levels remaining in said power sources, and/or the power to be used when communicating over a particular type of available wireless network, when the tracking device determines a quantity, a frequency, sensor data, and the like for communicating as part of a distress notification. Sending communications over a satellite network uses more power because a greater signal strength is employed, for instance, relative to sending communications over a Wi-Fi network, which uses less power because a lower strength signal is employed. Thus, when the tracking device determines there is limited available power and only a satellite network is in-range, the tracking device may determine that only a single distress notification (e.g., an SOS signal) or a fixed quantity of distress notifications may be generated and communicated based on the available power remaining and the power expected to be used to communicate over the satellite network. In some instances, when the tracking device determines there is sufficient available power and only a telecommunications network is in-range, the tracking device may determine that a fixed quantity of distress notifications may be generated and communicated based specifically on that available power remaining and the power expected to be used to communicate over the telecommunications network. In one instance, when at least a telecommunications network and a satellite network are each in-range, the tracking device may communicate a distress notification over one or both networks, for example, based specifically on the available power remaining and the wireless network types. Accordingly, the tracking device can intelligently determine how and when to communicate distress notifications. The distress notifications may be routed to a cloud-based platform that may initiate other actions, such as triggering actions to be taken by emergency responders, sending additional notification(s) to other user(s) or device(s), or the like.

Accordingly, the tracking device can intelligently determine how (e.g., what wireless network to use that is in-range; quantity; what location and/or sensor data to be included in the notification[s]) and when (e.g., periodicity or frequency; one notification per day) to communicate distress notifications to efficiently optimize the tracking device's utilization based on the amount of power remaining in available power source(s), the type of wireless network to be used, and/or amounts of power used to operate a GPS system and/or one or more sensors that capture conditions of the tracking device.

FIG. 1 depicts an example of a network environment 100 in accordance with one or more aspects. The network environment 100 of FIG. 1 includes a network 102, a cloud-based platform 104 (e.g., server), a database 106, a tracking device 108, and a user device 110. In aspects, the network 102 is a telecommunications network having a plurality of access points that provide service to a plurality of user devices, such as the tracking device 108 and the user device 110. The cloud-based platform 104 and the database 106 operate within the network 102, and as further discussed, can provide services to users via the tracking device 108 and the user device 110. The cloud-based platform 104 may be a virtual server that operates in a cloud computing environment, and which is supported by individual server(s) in data centers. Although a cloud-based platform 104 is discussed herein, it will be understood that platforms which are partially cloud-based or are not cloud-based may be utilized and leveraged, whether alone or in connection with a cloud-based server to perform aspects discussed herein. The database 106 can operate as cloud-based storage that supports the cloud-based platform 104 in a cloud computing environment as shown, or it may instead be partially cloud-based or not cloud-based, in various aspects.

The tracking device 108 (interchangeably referred to as a "tracker") of FIG. 1 is a type of user device having sensor(s) 111, a processor 112, a memory 114, a radio 116, a location service module such as a global positioning system 118, and a power supply 120. The sensor(s) 111 may include one or more sensors of the same or different kinds, such as a gyroscope, an accelerometer (e.g., for detecting and measuring movement of the tracking device 108), an optical sensor (e.g., for detecting and measuring light), a temperature sensor, an atmospheric pressure sensor, a humidity or water sensor, the like, and/or any combination thereof. The processor 112 may be a microcontroller unit and/or a microprocessor unit configured to operate and control hardware components of the tracking device 108, in various aspects. The memory 114 may be physical memory for storing data and computer-readable instructions for execution and implementation via the processor 112, and/or any other components of the tracking device 108. The radio 116 may be configured to send and receive wireless communications using multiple modalities, connections, and/or networks, concurrently or non-concurrently, including telecommunications, Wi-Fi, short-range wireless (e.g., Bluetooth®), Near Field Communication (NFC), and the like using one or more antenna. The location service module, shown in FIG. 1 as the global positioning system 118, is a hardware component that utilizes measurements to determine the location, direction of travel, and/or speed (e.g., velocity) of travel of the tracking device 108 in real-time or near real-time using a satellite network (not shown) that is accessible using a satellite 117 as an aerospace access point. The power supply 120 stores and provides energy to the tracking device 108 and its components. The power supply 120 may be a battery, in some aspects.

In various aspects, the tracking device 108 includes additional features and components, such as a speaker, a light or light-emitting diode, a microphone, a modem, a low dropout regulator (LDO), and/or the like. In some aspects, the tracking device 108 operates for tracking purposes and may not be configured to handle telephone calls and/or messaging services such as Short Message/Messaging Service (SMS). As such, the tracking device 108 can be physically compact and small in size relative to the user device 110, which may be a smartphone or computing device such as a laptop or tablet. Based on the compact dimensions, the tracking device 108 can be physically attached to an item to be tracked or carried along with a person.

It should also be understood that the network environment 100 shown in FIG. 1 is only one example of a suitable network environment 100, and this example has been simplified for ease of discussion. Accordingly, other components not shown may also be included within the environment, and one or more of the shown component may be omitted, in various embodiments. Each of the components of FIG. 1 may be implemented using any type or number. The components may communicate with each other directly or, for example, indirectly via a network, including one or more of a telecommunication network, a local area network (LANs), a wide area network (WANs), and/or a peer-to-peer-network. Such networking environments may include campus-wide or enterprise-wide computer networks, intranets, and the Internet. It should be understood that any number of components shown in FIG. 1 may be employed within the network environment 100 within the scope of the present invention. Each may be implemented via a single device or multiple devices cooperating in a distributed environment.

Figure 2:
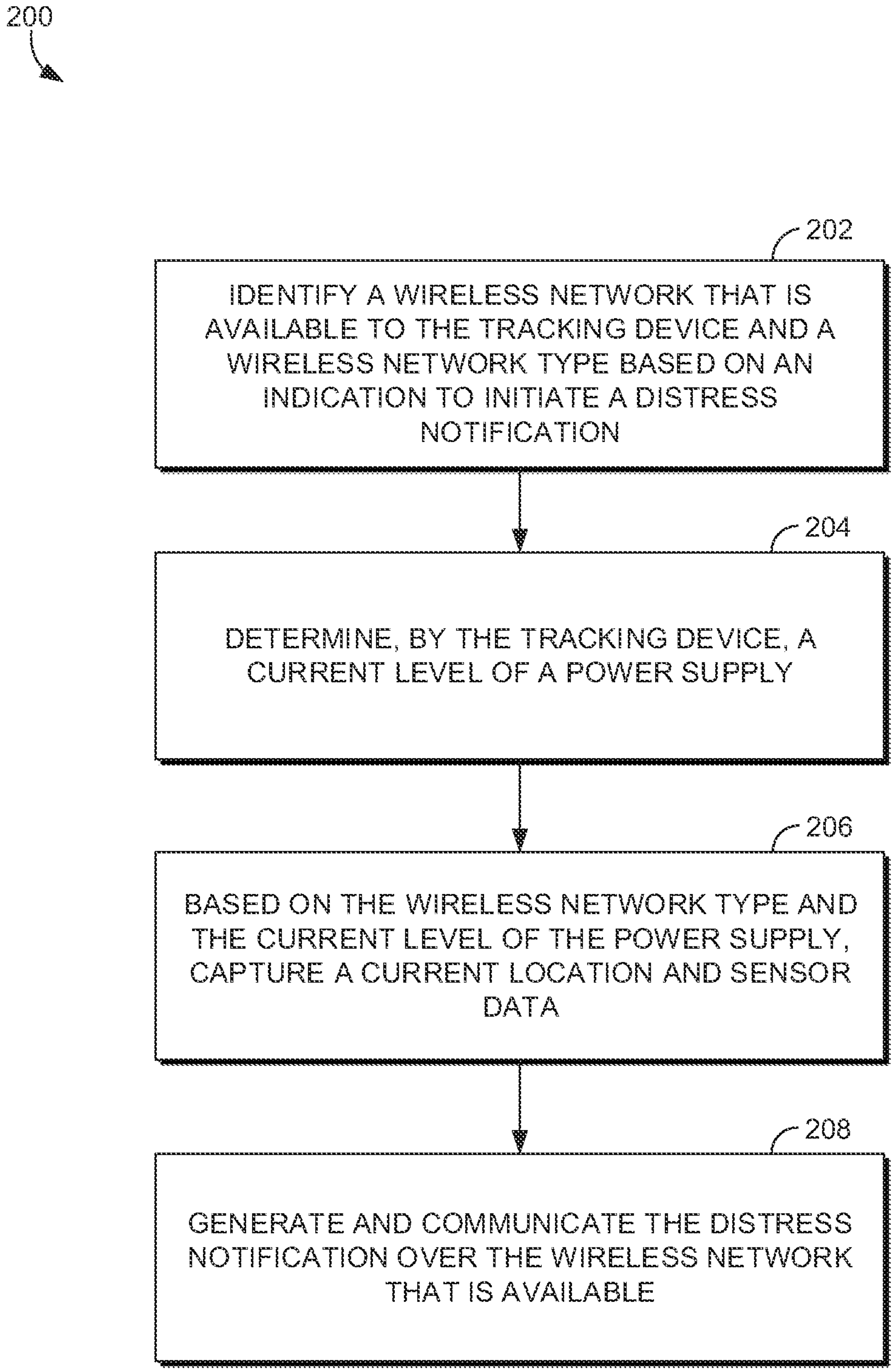
FIG. 2 is a flowchart for an example method in accordance with aspects.

FIG. 2 depicts a flowchart for an example method 200 to be performed in accordance with aspects herein, such as through components device shown in FIG. 1. An indication to initiate distress notification may be received by a tracking device 108, whether initiated by user input to the tracking device 108, initiated by user input to another proximate device (e.g., a smartphone that is paired with the tracking device 108; user device 110) that can send communications to the tracking device 108, initiated automatically by the tracking device 108 based on sensor data, and/or initiated automatically based on a communication sent to the tracking device 108 by the proximate device. As such, one or more actions, whether external to the tracking device 108 and/or performed actively or passively by the tracking device 108, may be used to initiate or trigger the method 200.

The tracking device 108, at block 202, identifies a wireless network that is available to the tracking device 108 as being in-range, and identifies the wireless network type of that wireless network, based on and/or in response to the indication to initiate a distress notification. For example, the tracking device 108 may send and/or receive communications in order to determine whether various networks are in-range, and thus, which networks may be available for use in communicating a distress notification. Synchronization signals or other signals might be received and/or detected by the tracking device 108, in aspects. The tracking device 108 may, directly or indirectly, request in-range network information through another proximate device, in some aspects. Accordingly, the tracking device 108 may actively or passively "scan" and/or "listen" for a Wi-Fi wireless network type and/or a telecommunications wireless network type that may be in-range, for example. When a Wi-Fi wireless network type and a telecommunications wireless network type are determined by the tracking device 108 to be unavailable, the tracking device 108 may determine that it may use a satellite wireless network type for the distress notification.

At block 204, the tracking device 108 determines a current level of the power supply 120. In aspects, the tracking device 108 may measure a current level of a power supply 120, such as the amount of remaining energy in a battery and/or an accessory battery pack, for example. At block 206, based on the wireless network type and the current level of the power supply 120, the tracking device 108 causes the GPS system 118 to capture a current location and the sensor(s) 111 to capture sensor data. For example, the tracking device 108 may determine that the current level of the power supply 120, such as the total amount of remaining energy in a battery, supports the generation and communication of a particular quantity of distress notifications of a sufficient signal strength to be sent over the wireless network type that is in-range. Additionally, in some aspects, the tracking device 108 may determine that the current level of the power supply 120 supports, in addition to the distress notification(s), causing the sensor(s) to obtain current measurements of the tracking device's surroundings, for example, such as temperature and altitude, that may be included with the distress notification(s). As such, the tracking device 108 may cause the sensor 111 to measure a condition of the environment of the tracking device 108 and further, to encode a measurement captured by the sensor 111 into the distress notification to be generated. In aspects, the tracking device 108 may determine its current location by using the global positioning system 118 that is integrated into the tracking device 108, wherein the current location comprises of GPS coordinates. Location data may include, for example, GPS coordinates, signal strength measurements, and the like. Sensor data may include, for example, measurements of ambient temperature, moisture, altitude, and the like.

Although GPS systems are discussed herein, other technologies are contemplated and considered within the scope of this disclosure. For example, the tracking device 108 may determine its own location using the location of an in-range mobile device as a proxy, which the tracking device 108 can communicate using Bluetooth®.

In some aspects, the tracking device 108 may determine whether the current level of the power supply 120 of the tracking device 108 is above a first threshold. Based on determining that the current level of the power supply 120 is at or above a first threshold, for example, the tracking device 108 may determine that the current level of the power supply 120 supports generating and communicating a plurality of distress notifications over the particular type of wireless network that is in-range. In another aspect, the tracking device 108 may determine whether the current level of the power supply 120 of the tracking device 108 is below a first threshold. Based on determining that the current level of the power supply 120 is below the first threshold, for example, the tracking device 108 may determine that the current level of the power supply 120 supports the generation and communication of only one distress notification over the particular type of wireless network that is in-range.

In some aspects, the tracking device 108 may determine whether, based the current level of the power supply 120, the current level of the power supply 120 supports communication of a limited amount of sensor data in addition to one or more distress notifications. In such an aspect, the tracking device 108 may reference a prioritization schema and determination of specific sensor data to include based on the type of sensor and/or the sensor data itself. In one example, based the current level of the power supply 120, the tracking device 108 may reference a prioritization schema and determine that location information and temperature data should be included alongside the one or more distress notifications, whereas data from an optical sensor is to be omitted and not communicated at that time. The prioritization schema may be predetermined and/or may be customized by a user through an application interface, such that the specific sensor data to be included may be determined by the tracking device 108 based on the sensor data, based on the sensor data relative to one or more thresholds, current level of the power supply 120, and/or any combination thereof.

At block 208, the tracking device 108 generates and communicates, over the wireless network that is available, the distress notification that comprises the current location and the sensor data. In aspects, when the current level of the power supply 120 of the tracking device 108 is at or above a first threshold, the tracking device 108 may generate and communicate a plurality of distress notifications. In such an example, the tracking device 108 may periodically generate the plurality of distress notifications that comprise a plurality of current locations (e.g., current location is reassessed for each notification when notifications are sent over a time interval) and a plurality of current sensor data (e.g., sensor data can be captured again when notifications are sent over a time interval), and periodically communicate the plurality of distress notifications at defined time intervals. In aspects, when the current level of the power supply 120 of the tracking device 108 is below a first threshold, the tracking device 108 may determine that the current level of the power supply 120 supports one distress notification, and as such, the tracking device 108 may generate and communicate only one distress signal that comprises the current location and the sensor data over the wireless network.

Additionally or alternatively, when the tracking device 108 determines that the current level of the power supply 120 supports one distress notification, the tracking device 108 may provide output that instructs a user to manipulate (e.g., positioning, rotation, direction facing, etc. in threedimensions) the tracking device 108 into a particular physical position or orientation prior to communicating with the wireless network that is available. The particular physical position or orientation may correspond to positioning an antenna of the tracking device 108 in a way that optimizes signals in strength and direction, for example, to aim the antenna toward a satellite and/or a satellite network. The output may be at least one of a visual, audible, and/or haptic output. For example, the output may include light (e.g., flashing frequency, color, or brightness changes), sound (e.g., frequency of a tone emitted in pulses, changing the tone or pitch of a tone being emitted), and/or vibration (e.g., frequency of a vibration, vibration pattern, strength of vibration changes) to signal to the user whether the tracking device 108 is approaching the desired positioning, is moving away from the desired positioning, and/or has reached the desired positioning. Then, the tracking device 108 may determine when the tracking device 108 has been placed into the particular position. In response to determining that the tracking device 108 has been placed into the particular position (e.g., optimized antenna positioning), the tracking device 108 may automatically communicate the distress notification over the wireless network that is available. Alternatively, a user may provide an input that causes the tracking device 108 to communicate the distress notification over the wireless network that is available.

The method 300 may be a computer-implemented method, in various aspects, for example, using non-transitory computer-readable storage medium having computer-readable program code portions embodied therein are used to implement the method 300. For example, the computer-readable program code portions may include one or more executable portions configured to perform the method 300, in aspects.

Figure 3:
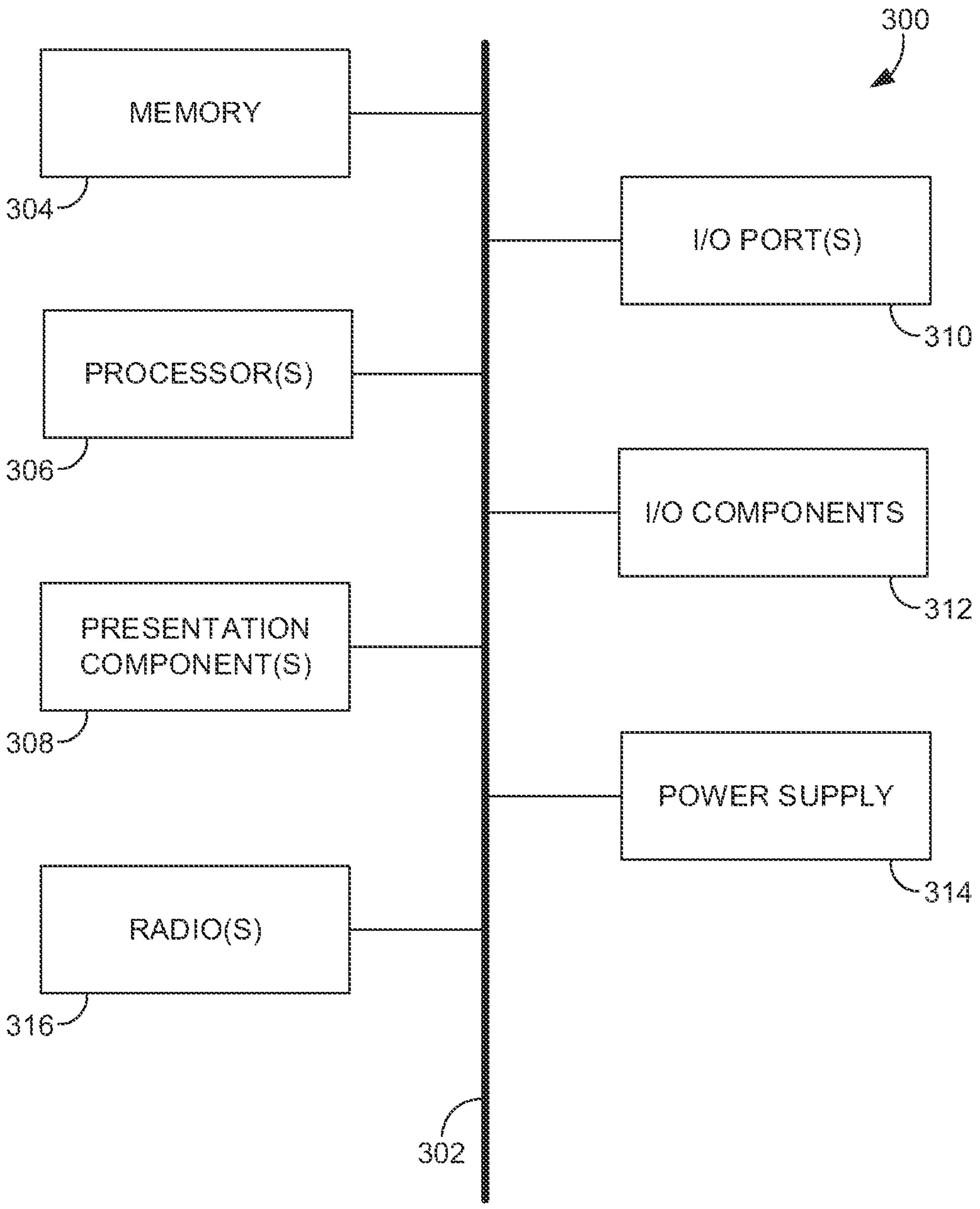
FIG. 3 is an example device suitable for use in implementations of the disclosure.

Turning to FIG. 3, an example computing device 300 is shown that is suitable for use in implementations of the disclosure. Computing device 300 is but one example of a suitable computing environment and is not intended to suggest any limitation as to the scope of use or functionality of the invention, and nor should computing device 300 be interpreted as having any dependency or requirement relating to any one or combination of components illustrated.

The implementations of the present disclosure may be described in the general context of computer code or machine-useable instructions, including computer-executable instructions such as program components being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 3, computing device 300 includes bus 302 that directly or indirectly couples with the following devices: memory 304, one or more processors 306, one or more presentation components 308, input/output (I/O) ports 310, I/O components 312, and power supply 314. Bus 302 represents what may be one or more buses (such as an address bus, data bus, or combination thereof). Although the devices of FIG. 3 are shown with lines for the sake of clarity, in reality, delineating various components is not so clear, and metaphorically, the lines would more accurately be grey and fuzzy. For example, one may consider a presentation component such as a display device to be one of I/O components 312. Also, processors, such as one or more processors 306, have memory. Distinction is not made between such categories as "workstation," "server," "laptop," "handheld device," etc., as all are contemplated within the scope of FIG. 3 and refer to "computer" or "computing device."

Computing device 300 typically includes a variety of computer-readable media. Computer-readable media can be any available media that can be accessed by computing device 300 and includes both volatile and non-volatile media, removable and non-removable media. By way of example, and not limitation, computer-readable media may comprise computer storage media and communication media. Computer storage media includes both volatile and non-volatile, removable and non-removable media implemented in any method or technology for storage of information, such as computer-readable instructions, data structures, program modules, or other data.

Computer storage media includes RAM, ROM, EEPROM, flash memory or other memory technology, CD-ROM, digital versatile disks (DVDs) or other optical disk storage, magnetic cassettes, magnetic tape, and magnetic disk storage or other magnetic storage devices. Computer storage media does not comprise a propagated data signal.

Communication media typically embodies computer-readable instructions, data structures, program modules or other data in a modulated data signal (such as a carrier wave or other transport mechanism), and includes any information delivery media. The term "modulated data signal" indicates a signal that has one or more of its characteristics set or changed in such a manner so as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 304 includes computer storage media in the form of volatile and/or non-volatile memory. Memory 304 may be removable, non-removable, or a combination thereof. Examples of memory include solid-state memory, hard drives, optical disc drives, etc. Computing device 300 includes one or more processors 306, which read data from various entities such as bus 302, memory 304, or I/O components 312. One or more presentation components 308 present data indications to a person or other device. Examples of one or more presentation components 308 include a display device, speaker, printing component, vibrating component, etc. I/O ports 310 allow computing device 300 to be logically coupled to other devices including I/O components 312, some of which may be built into computing device 300. Illustrative I/O components 312 include a microphone, joystick, game pad, satellite dish, scanner, printer, wireless device, etc.

Radio 316 represents a radio that facilitates communication with a wireless telecommunications network. Illustrative wireless telecommunications technologies include CDMA, GPRS, TDMA, GSM, and the like. Radio 316 might additionally or alternatively facilitate other types of wireless communications including Wi-Fi, WiMAX, LTE, or other VOIP communications. As can be appreciated, in various aspects the radio 316 can be configured to support multiple technologies, and/or multiple radios can be utilized to support multiple technologies. A wireless telecommunications network might include an array of devices, which are not shown so as to not obscure more relevant aspects of the invention. Components such as a base station, a communications tower, or even access points (as well as other components) can provide wireless connectivity in some aspects.

Many different arrangements of the various components depicted, as well as components not shown, are possible without departing from the scope of the claims below. Aspects of our technology have been described with the intent of being illustrative rather than restrictive. Alternative aspects will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

What is claimed is:

1. A computerized method comprising:

based on an indication to initiate a distress notification, identifying one or more wireless networks that are available to a tracking device and a wireless network type of each of the one or more wireless networks;

determining a current level of a power supply of the tracking device;

determining a wireless network of the one or more wireless networks over which to communicate the distress notification based on the wireless network type of the wireless network and the current level of the power supply of the tracking device;

based on the wireless network type and the current level of the power supply, capturing a current location via a location service module and sensor data via one or more sensors, wherein a type and a quantity of the sensor data captured are determined based on the wireless network type, the current level of the power supply of the tracking device, and an amount of power used to operate the location service module and the one or more sensors;

determining a type of the distress notification to communicate and a frequency of communicating the distress notification to optimize communication of the distress notification based on both the wireless network type and the current level of the power supply of the tracking device; and generating the distress notification of the determined distressed notification type comprising the current location and the determined quantity and the determined type of the sensor data;

communicating, from the tracking device over the wireless network, the distress notification for the determined frequency.

2. The computerized method of claim 1, further comprising:

scanning for a Wi-Fi wireless network type;

scanning for a telecommunications wireless network type; and when the Wi-Fi wireless network type and the telecommunications wireless network type are determined to be unavailable based on the scanning, determining to use a satellite wireless network type for the distress notification.

3. The computerized method of claim 1, further comprising:

determining the current location of the tracking device by using a global positioning system that is integrated into the tracking device, wherein the current location comprises of GPS coordinates.

4. The computerized method of claim 1, further comprising:

causing a sensor to measure a condition of the environment of tracking device; and encoding a measurement captured by the sensor into the distress notification.

5. The computerized method of claim 1, further comprising:

determining that the current level of the power supply of the tracking device is above a first threshold;

based on determining the current level of the power supply is above the first threshold, determining the current level of the power supply supports a plurality of distress notifications; and wherein generating and communicating the distress notification comprises periodically generating the plurality of distress notifications that comprise a plurality of current locations and a plurality of current sensor data, and communicating the plurality of distress notifications at defined time intervals.

6. The computerized method of claim 1, further comprising:

determining that the current level of the power supply of the tracking device is above a first threshold;

based on determining the current level of the power supply is above the first threshold, determining the current level of the power supply supports a predefined quantity of distress notifications; and wherein generating and communicating the distress notification comprises periodically generating each of the predefined quantity of distress notifications that comprise a plurality of current locations and a plurality of current sensor data, and communicating each of the predefined quantity of distress notifications at defined time intervals.

7. The computerized method of claim 1, further comprising:

determining that the current level of the power supply of the tracking device is below a first threshold; and based on determining the current level of the power supply is below the first threshold, determining that the current level of the power supply supports one distress notification.

8. The computerized method of claim 7, further comprising:

based on determining that the current level of the power supply supports one distress notification, providing output from the tracking device that instructs a user to manipulate the tracking device into a particular position prior to communicating with the wireless network that is available, the output being at least one of visual, audible, or haptic output;

determining, using a sensor, that the tracking device has been placed into the particular position; and in response to determining that the tracking device has been placed into the particular position, automatically communicating the distress notification over the wireless network that is available.

9. One or more non-transitory computer-readable media storing instructions that when executed via one or more processors perform a computerized method, the media comprising:

based on an indication to initiate a distress notification, identify one or more wireless networks that are available to a tracking device and a wireless network type of each of the one or more wireless networks;

determine a current level of a power supply of the tracking device;

determine a wireless network of the one or more wireless networks over which to communicate the distress notification based on the wireless network type of the wireless network and the current level of the power supply of the tracking device;

based on the wireless network type and the current level of the power supply, capture a current location via a location service module and sensor data via one or more sensors, wherein a type and a quantity of the sensor data captured are determined based on the wireless network type, the current level of the power supply of the tracking device, and an amount of power used to operate the location service module and the one or more sensors;

determine a type of the distress notification to communicate and a frequency of communicating the distress notification to optimize communication of the distress notification based on both the wireless network type and the current level of the power supply of the tracking device; and generate the distress notification of the determined distressed notification type comprising the current location and the determined quantity and the determined type of the sensor data;

communicate, from the tracking device over the wireless network, the distress notification for the determined frequency.

10. The media of claim 9, further comprising via the one or more processors:

scan for a Wi-Fi wireless network type;

scan for a telecommunications wireless network type; and when the Wi-Fi wireless network type and the telecommunications wireless network type are determined to be unavailable based on the scanning, determine to use a satellite wireless network type for the distress notification.

11. The media of claim 9, further comprising via the one or more processors:

determine the current location of the tracking device by using a global positioning system that is integrated into the tracking device, wherein the current location comprises of GPS coordinates.

12. The media of claim 9, further comprising the via the one or more processors:

determine that the current level of the power supply of the tracking device is above a first threshold; and based on determining the current level of the power supply is above the first threshold, determine the current level of the power supply supports a plurality of distress notifications;

wherein the generation and communication of the distress notification comprises generating the plurality of distress notifications that comprise a plurality of current locations and a plurality of current sensor data and communicating the plurality of distress notifications at defined time intervals.

13. The media of claim 9, further comprising via the one or more processors:

determine that the current level of the power supply of the tracking device is above a first threshold;

based on determining the current level of the power supply is above the first threshold, determine the current level of the power supply supports a predefined quantity of distress notifications; and wherein the generation and communication of the distress notification comprises periodically generating each of the predefined quantity of distress notifications that comprise a plurality of current locations and a plurality of current sensor data and communicating each of the predefined quantity of distress notifications at defined time intervals.

14. The media of claim 9, further comprising via the one or more processors:

determine that the current level of the power supply of the tracking device is below a first threshold; and based on determining the current level of the power supply is below the first threshold, determine that the current level of the power supply supports one distress notification.

15. The media of claim 9, further comprising via the one or more processors:

based on determining that the current level of the power supply supports one distress notification, provide output from the tracking device that instructs a user to manipulate the tracking device into a particular position prior to communicating with the wireless network that is available, the output being at least one of visual, audible, or haptic output;

determine, using a sensor, that the tracking device has been placed into the particular position; and in response to determining that the tracking device has been placed into the particular position, automatically communicate the distress notification over the wireless network that is available.

16. A tracking device comprising:

a memory;

a sensor;

a global positioning system;

an antenna;

a power supply; and a processor configured to:

based on an indication to initiate a distress notification, identify one or more wireless networks that are available to the tracking device and a wireless network type of each of the one or more wireless networks;

determine a current level of the power supply of the tracking device;

determine a wireless network of the one or more wireless networks over which to communicate the distress notification based on the wireless network type of the wireless network and the current level of the power supply of the tracking device;

based on the wireless network type and the current level of the power supply, capture a current location via the global positioning system and sensor data via the sensor, wherein a type and a quantity of the sensor data captured are determined based on the wireless network type, the current level of the power supply of the tracking device, and an amount of power used to operate the global positioning system and the sensor;

determine a type of the distress notification to communicate and a frequency of communicating the distress notification to optimize communication of the distress notification based on both the wireless network type and the current level of the power supply of the tracking device; and generate the distress notification of the determined distressed notification type comprising the current location and the determined quantity and the determined type of the sensor data;

communicate, from the tracking device over the wireless network, the distress notification for the determined frequency.

17. The tracking device of claim 16, wherein the processor is configured to:

determine the current location of the tracking device by using the global positioning system that is integrated into the tracking device, wherein the current location comprises of GPS coordinates.

18. The tracking device of claim 16, wherein the processor is configured to:

cause the sensor to measure a condition of the environment of tracking device; and encode a measurement captured by the sensor into the distress notification.

19. The tracking device of claim 16, wherein the processor is configured to:

determine that the current level of the power supply of the tracking device is above a first threshold;

based on determining the current level of the power supply is above the first threshold, determining the current level of the power supply supports a plurality of distress notifications; and wherein the generation and communication of the distress notification comprises periodically generating the plurality of distress notifications that comprise a plurality of current locations and a plurality of current sensor data, and communicating the plurality of distress notifications at defined time intervals.

20. The tracking device of claim 16, wherein the processor is configured to:

determine that the current level of the power supply of the tracking device is below a first threshold;

based on determining the current level of the power supply is below the first threshold, determine that the current level of the power supply supports one distress notification;

based on determining that the current level of the power supply supports one distress notification, provide output from the tracking device that instructs a user to manipulate the tracking device into a particular position prior to communicating with the wireless network that is available, the output being at least one of visual, audible, or haptic output;

determine that the tracking device has been placed into the particular position; and in response to determining that the tracking device has been placed into the particular position, automatically communicate the distress notification over the wireless network that is available.

* * * * *